United States Patent
Schlipf et al.

(10) Patent No.: US 9,567,064 B2
(45) Date of Patent: Feb. 14, 2017

(54) HIGH LIFT COMPONENT FOR AN AIRCRAFT, HIGH LIFT SYSTEM, METHOD FOR ADJUSTING THE HIGH LIFT CHARACTERISTICS OF AN AIRCRAFT AND AIRCRAFT

(71) Applicant: Airbus Operations GmbH, Hamburg (DE)

(72) Inventors: Bernhard Schlipf, Bremen (DE); Xavier Hue, Bremen (DE)

(73) Assignee: Airbus Operations GmbH (DE)

( * ) Notice: Subject to any disclaimer, the term of this patent is extended or adjusted under 35 U.S.C. 154(b) by 612 days.

(21) Appl. No.: 14/063,654

(22) Filed: Oct. 25, 2013

(65) Prior Publication Data
US 2014/0048656 A1 Feb. 20, 2014

Related U.S. Application Data

(63) Continuation of application No. PCT/EP2012/057737, filed on Apr. 27, 2012.

(60) Provisional application No. 61/479,928, filed on Apr. 28, 2011.

(30) Foreign Application Priority Data

Apr. 28, 2011 (DE) .......... 10 2011 018 907

(51) Int. Cl.
*B64C 9/22* (2006.01)
*B64C 9/14* (2006.01)
*B64C 9/02* (2006.01)

(52) U.S. Cl.
CPC . *B64C 9/22* (2013.01); *B64C 9/02* (2013.01); *B64C 9/14* (2013.01)

(58) Field of Classification Search
CPC ................ B64C 9/14; B64C 9/16–9/28; B64C 2009/143; B64C 3/46
See application file for complete search history.

(56) References Cited

U.S. PATENT DOCUMENTS

| | | | | |
|---|---|---|---|---|
| 2,378,528 A * | 6/1945 | Arsandaux | ................ | B64C 3/46 244/134 A |
| 2,772,842 A * | 12/1956 | Darby | ........................ | B64C 9/02 244/90 B |
| 3,128,966 A | 4/1964 | Alvarez-Calderon | | |
| 3,480,237 A | 11/1969 | Appleby | | |
| 3,711,039 A * | 1/1973 | James | ........................ | B64C 9/22 244/214 |
| 5,222,692 A * | 6/1993 | Glowacki | ............. | F01D 11/005 244/129.1 |

(Continued)

FOREIGN PATENT DOCUMENTS

| | | |
|---|---|---|
| CN | 1982157 A | 6/2007 |
| CN | 101267980 A | 9/2008 |

(Continued)

*Primary Examiner* — Justin Rephann
(74) *Attorney, Agent, or Firm* — Lerner, David, Littenberg, Krumholz & Mentlik, LLP (57) ABSTRACT

A high lift component includes at least one intermediate seal on at least one lateral surface, wherein the intermediate seal includes at least one hollow body made of an elastic material, which hollow body includes a fluid inlet that is connectable to a fluid source. A gap between two high lift components, which gap is subjected to dynamic changes in geometry, can be flexibly sealed in this manner.

12 Claims, 7 Drawing Sheets

(56) References Cited

U.S. PATENT DOCUMENTS

| | | | | |
|---|---|---|---|---|
| 5,706,648 A * | 1/1998 | Porte | ............... | F02K 1/805 244/54 |
| 5,845,877 A * | 12/1998 | Justice | ............... | B64C 9/02 244/131 |
| 6,135,395 A * | 10/2000 | Collett | ............... | B64C 9/22 244/130 |
| 6,145,791 A * | 11/2000 | Diller | ............... | B64C 9/02 244/130 |
| 6,951,319 B2 * | 10/2005 | Colich | ............... | B60J 10/24 244/118.5 |
| 7,850,119 B2 * | 12/2010 | Martin Hernandez | ... | B64C 1/26 244/130 |
| 8,042,772 B2 * | 10/2011 | Lutke | ............... | B64C 3/46 244/123.11 |
| 8,079,809 B2 * | 12/2011 | Selder | ............... | F02C 3/10 277/596 |
| 8,534,611 B1 * | 9/2013 | Pitt | ............... | B64C 3/48 244/214 |
| 8,870,125 B2 * | 10/2014 | Balzer | ............... | B64C 9/16 244/215 |
| 2006/0022093 A1 * | 2/2006 | Poppe | ............... | B64C 9/04 244/215 |
| 2008/0169382 A1 * | 7/2008 | Martin Hernandez | ... | B64C 5/10 244/133 |
| 2010/0019095 A1 * | 1/2010 | Grohmann | ............... | B64C 7/00 244/210 |
| 2010/0041778 A1 | 2/2010 | Lake et al. | | |
| 2010/0147999 A1 | 6/2010 | Burgos Gallego et al. | | |
| 2010/0288888 A1 * | 11/2010 | Coconnier | ............... | B64C 7/00 244/214 |
| 2010/0327121 A1 * | 12/2010 | McAlinden | ............... | B64C 7/00 244/215 |
| 2014/0217236 A1 * | 8/2014 | Bonatto | ............... | B64C 7/00 244/1 N |

FOREIGN PATENT DOCUMENTS

| | | |
|---|---|---|
| CN | 101678893 A | 3/2010 |
| CN | 201432681 Y | 3/2010 |
| DE | 11 35 768 B | 8/1962 |
| FR | 2793538 A1 | 11/2000 |
| WO | 2008129074 A1 | 10/2008 |

* cited by examiner

HIGH LIFT COMPONENT FOR AN AIRCRAFT, HIGH LIFT SYSTEM, METHOD FOR ADJUSTING THE HIGH LIFT CHARACTERISTICS OF AN AIRCRAFT AND AIRCRAFT

CROSS-REFERENCE TO RELATED APPLICATIONS

The present application is a continuation of International Application No. PCT/EP2012/057737, filed Apr. 27, 2012, which claims priority from German Patent Application No. 10 2011 018 907.6, filed Apr. 28, 2011, and which claims the benefit of the filing date of U.S. Provisional Application No. 61/479,928, filed Apr. 28, 2011, the disclosures of which are incorporated herein by reference in their entirety.

TECHNICAL FIELD

The invention relates to a high lift component for an aircraft, to a high lift system, to a method for adjusting the high lift characteristics of an aircraft, and to an aircraft.

BACKGROUND OF THE INVENTION

In order to reduce takeoff and landing speeds, modern commercial aircraft frequently comprise high lift components which when required effect a significant increase in the surface of a wing and its curvature. Apart from single-part and multi-part trailing edge flaps of various designs, there are also slats, leading edge flaps and nose flaps on the wing leading edge. Because of the wingspan of larger aircraft, a profile thickness that decreases towards the outside, and sometimes a different movement path between the outside and the inside of leading edge flaps, such high lift components are usually segmented. The individual segments are individually moved.

It is known to arrange intermediate seals between adjacent segmented high lift components, which intermediate seals close the gap between the high lift components. Consequently, adjacent high lift components form an essentially uninterrupted contour so that the performance of the high lift system is improved because gap flows can be largely avoided.

At the same time, the state of the art shows that in particular in larger wingspans, gaps between adjacent high lift components are increased during deflection of the wing to such an extent that intermediate seals arranged therein are no longer able to completely close the gap. This results in performance losses in the high lift system.

PRESENTATION OF THE INVENTION

An aspect of the invention proposes an improved high lift component or an improved high lift system for improving the performance by means of improved intermediate seals. The performance should remain constant, to the largest extent possible, even in the case of different displacement speeds of adjacent high lift components and even in the case of considerable deflection of the wing.

A central idea of the invention consists of providing a high lift component according to an embodiment of the present invention on at least one lateral surface with an intermediate seal comprising at least one hollow body made of an elastic material, wherein the hollow body comprises a fluid inlet that can be connected to a fluid source.

The term "high lift component" refers to a lift body that comprises two lateral surfaces and that can be moved, by way of an actuator, drive kinematics or some other devices, in a predetermined manner to a wing in order to achieve an increase in the lift of the wing. The high lift component can be implemented in a variety of ways. If the high lift component is designed as a Krueger flap, it is preferably pivotably held at an end or in an end region, and can be deflected from the underside of the wing in the direction of flight into the airstream. In contrast to this, a slat can be moved along a movement path from a leading edge section of the wing, in a translatory manner along a curved path, in such a manner into the airflow that a gap arises between the slat and the leading edge section of the wing. A nose flap, in turn, is to be regarded as part of the wing, which part can essentially be pivoted on a hinge axis in order to increase the curvature of the wing. In principle, a high lift component can also be designed as a trailing edge flap which can be moved, for example in the form of a Fowler flap, along a predetermined movement path from the wing end to the direction of flow in order to increase the curvature and surface of the wing. Furthermore, double-gap flaps are known that in a manner similar to that of a Fowler flap can be moved away from a wing trailing edge in order to form two gaps to the wing trailing edge.

Basically all these high lift components comprise more or less pronounced lateral surfaces that form a gap to adjacent lateral surfaces of adjacent high lift components. This gap is necessary in order to avoid mechanical damage of the high lift components from occurring during independent actuation. It is the purpose of the intermediate seal according to an embodiment of the invention with a hollow space comprising an elastic material to fill in and to increase or decrease in an autonomous manner according to requirements in the case of changes to the gap geometries by elastic deformation of the hollow body with fluid contained in the hollow body. By applying fluid pressure to the fluid inlet, in the case of an increase in the space available, in the gap, for the intermediate seal, the hollow body is expanded by way of the fluid source so that said hollow body extends from the lateral surface towards the outside where it butts against a corresponding intermediate seal or an adjacent lateral surface of an adjacent high lift component.

With the use of an elastic material, on the one hand the ability of the intermediate seal to expand is provided, and on the other hand an intermediate seal designed in this manner is also sufficiently flexible so that it can be compressed by external mechanical action. If there is such an intermediate seal between two high lift components, and if the wing deflects to such an extent that the gap between the high lift components would be reduced, the corresponding intermediate seal can be squeezed. However, this does not result in the intermediate seal being damaged; instead, after the wing has swung back the intermediate seal can expand again and can also fill in any gap that may be of increased size.

Any sources of a fluid with a pressure higher than the respective ambient pressure of the high lift component can be considered as fluid sources. In a particularly simple manner in the case of an aircraft an air source may be used that may already be present in the form of ram air inlets, cooling air outlets, bleed air systems or the like, and which by means of a suitable line may be able to be connected to the intermediate seal of the high lift component. As an alternative it would also be possible to use dedicated pumps or blowers. If liquid fluids are selected for the expansion of the intermediate seal, it should be noted that this fluid remains liquid in the entire operating temperature range and that the hollow body is protected from damage as a result of crystal formation or excessive expansion during solidification, or excessive pressure during vaporization.

In an advantageous embodiment of the invention the hollow body of the intermediate seal is a hose-like body that is arranged along a largely closed path on the lateral surface of the high lift component. In this manner the largest possible circumferential distance is formed, which provides good coverage of the gap. A gap that tapers off results in a redistribution of fluid from the narrowing gap end to the widening gap end.

In an advantageous embodiment of the invention the high lift component comprises an upper outer surface which, for example, at least in some regions faces upstream in operation, and a lower outer surface which, for example, at least in some regions faces downstream in operation, wherein a passage extends from the lower or from the upper surface to the high lift component, and wherein the end situated in the interior of the high lift component is connected to the fluid connection. This design is associated with particular advantages in relation to high lift components comprising a lower surface and an upper surface, wherein one of these surfaces is not in direct fluidic contact with the surroundings. The passage concerned is preferably arranged in this surface so that with the high lift system deactivated, and consequently with the high lift component retracted, on the one hand the passage is protected against the surroundings, and on the other hand does not have any influence on the airflow around the wing. When the high lift component concerned is pivoted out or extended, the passage establishes fluidic contact with the surrounding airflow so that the pressure applied to the passage depends on the airflow around the high lift component. The position of the passage is to be selected in such a manner that in the extended state of the high lift component the pressure is higher than the static ambient pressure, and consequently with the high lift component extended, the hollow body is automatically pressurized from the passage. Consequently there is no need to provide active fluid sources.

In an advantageous embodiment the high lift component is designed as a Krueger flap which at its lower outer surface in its extended state comprises a passage that is connected to the fluid connection. With the Krueger flap extended, the hollow bodies of the intermediate seal are inflated and press towards any adjacent Krueger flaps.

In an advantageous embodiment of the invention the passage is connected to a valve. The valve can be a nonreturn valve or a switching valve that is connected to a control unit, and if required can feed the fluid from the passage to the hollow body. In this way it can be ensured that the hollow bodies are filled only if and when necessary. The switching valve may be controlled automatically or manually, either by a pilot or in an automated manner when an extended position of the high lift component has been reached.

In a further advantageous embodiment the fluid source is designed as a pitot tube that is located on an outside of the high lift component, of the superordinate wing or of some other part of the aircraft concerned, and which is connected to the fluid inlet of the hollow body by way of a fluid line.

In an advantageous embodiment the hollow body is of a hose-like design, comprises two closed ends, and extends along a path on the lateral surface of the high lift component, which path on the border extends along the upper outer surface and a wing leading edge. Such a design makes sense, in particular, in the case of very slender profiles that comprise only a very thin profile thickness.

In an advantageous embodiment of the invention the hollow body is arranged so as to be largely flush with the profile contour so that as flush as possible a closure of the gap is achieved.

An aspect relating to the high lift system includes a high lift system that comprises at least one intermediate seal that comprises at least one hollow body made of an elastic material, which hollow body comprises a fluid inlet that is connectable to a fluid source.

An aspect relating to the aircraft includes an aircraft comprising at least one high lift component as mentioned above.

An aspect relating to the method includes a method for adjusting the high lift characteristics of an aircraft, with the method comprising the steps of extending two adjacent high lift components of the aircraft from a retracted position to an extended position and expanding at least one intermediate seal that in the extended position of both high lift components is located between the high lift components so that in the extended position of the high lift components the at least one intermediate seal is expanded in such a manner that the space between the high lift components is essentially closed by the at least one intermediate seal. Preferably, expansion takes place by introducing fluid into at least one hollow body of the intermediate seal, wherein in an advantageous embodiment this can also include introducing ram air that can originate from a passage that projects into the high lift component or from a pitot tube. By controlling a valve it is possible to achieve a selective introduction of fluid.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1A:
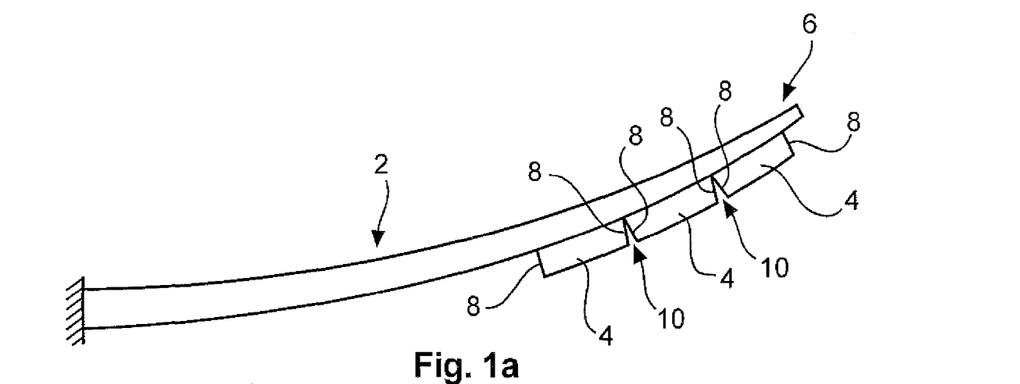
FIGS. 1a to 1c show an overall view (FIG. 1a) of a wing with high lift components, and detailed views of the region between the high lift components (FIGS. 1b and 1c).

FIG. 1a shows a wing 2 on which as an example high lift components 4 are arranged side by side. As a result of static and dynamic lift-induced loads acting on the wing 2, during operation of the aircraft significant deflection can occur, which deflection manifests itself in upwards movements and downwards movements of a wing tip 6. To prevent damaging the high lift components 4 during such behavior of the wing 2, for example by mutual friction or mutual striking of lateral surfaces 8, gaps 10 are provided between the high lift components 4.

The high lift components 4 contribute to increasing the lift of the wing 2 in that both the surface and the curvature of the wing 2 are increased. However, the gaps 10 are associated with a disadvantage in that they let an airflow pass through, which results in a reduction in the effectiveness of the high lift components 4.

Figure 1B:
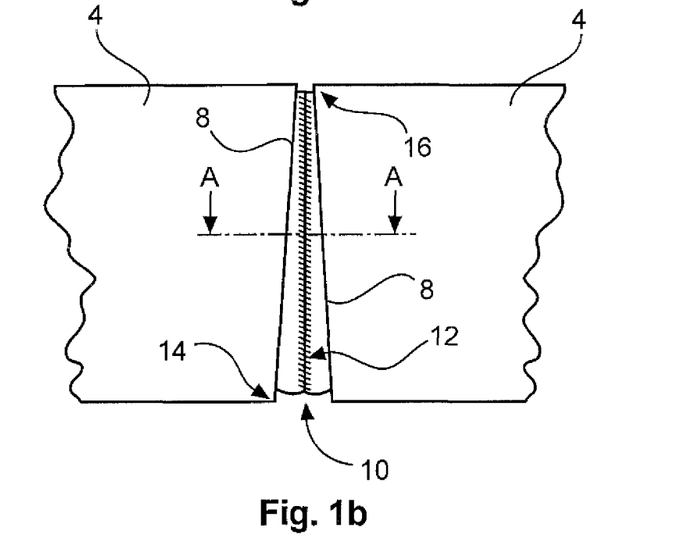

As shown in FIG. 1b the gap 10 can be closed by an intermediate seal 12. Consequently a largely closed surface between the high lift components 4 is present at all times so that the effectiveness of a high lift system with such high lift components 4 can be increased.

As also shown in FIG. 1b, the gap 10 has a tapered shape, wherein the intermediate seal 12 is sufficiently elastic to completely close both a wider end 14, which faces, for example, downstream, and a narrower end 16. Dynamic movement of a wing 2 with high lift components 4 arranged thereon and with intermediate seals 12 according to the invention can correspondingly also be operated in a particularly effective manner in the case of variable gap geometries.

Figure 1C:
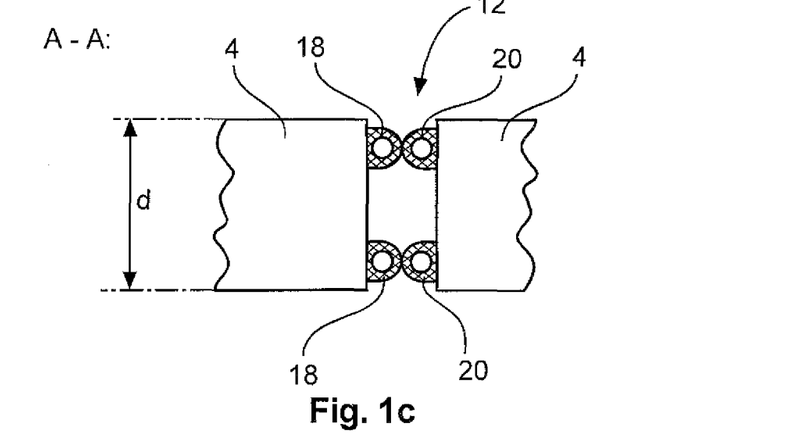

FIG. 1c shows a section of the intermediate seal 12. The illustration shows sections of two high lift components 4, arranged side by side, with lateral surfaces 8 facing each other, on which lateral surfaces 8 in each case, as an example, two spaced-apart sections of hollow bodies 18 and 20 are shown which touch the respective corresponding hollow bodies 20 or 18. According to an embodiment of the invention, the hollow bodies 18 and 20 comprise a fluid that preferably comprises a certain compressibility so that an elastic spring-like behavior of the hollow bodies results. The material of the hollow bodies is preferably a synthetic material in the form of an elastomer or of a thermoplastic material that provides adequate elasticity even at low temperatures and which does not tend to become brittle.

Figure 2A:
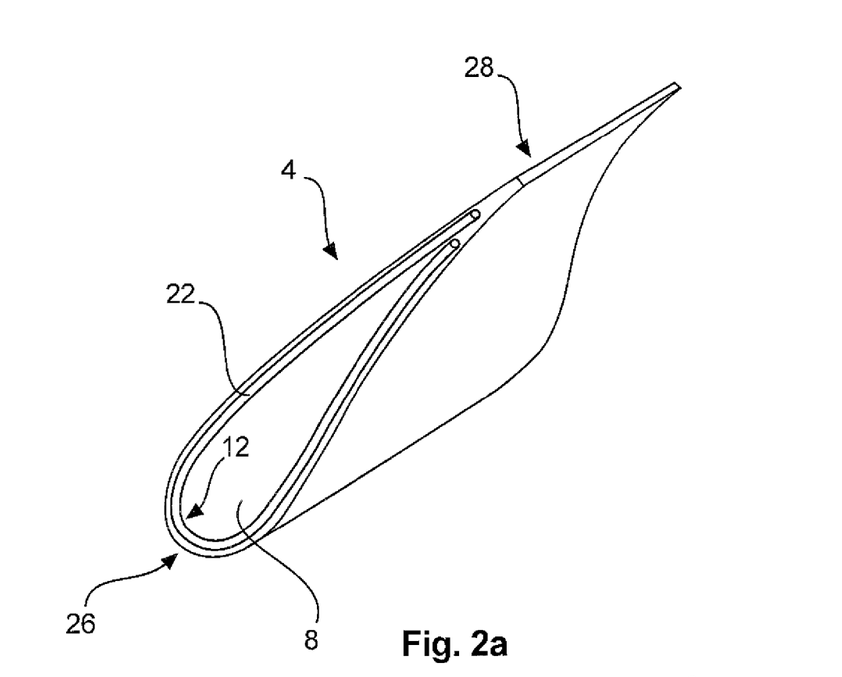
FIGS. 2a and 2b show a three-dimensional view of two exemplary embodiments of intermediate seal arrangements.

Preferably, the entire gap 10 is sealed by means of an intermediate seal. Depending on a profile thickness d of the high lift components 4 and thus of the area of the lateral surfaces 8, an intermediate seal 12 can comprise a greater or lesser distance of one or several hollow bodies. Preferably, as shown in FIG. 2a, there is an extension of a hollow body 22 on a path near the edge on the respective edge area 8, which path comprises a largely closed circumference.

Figure 2B:
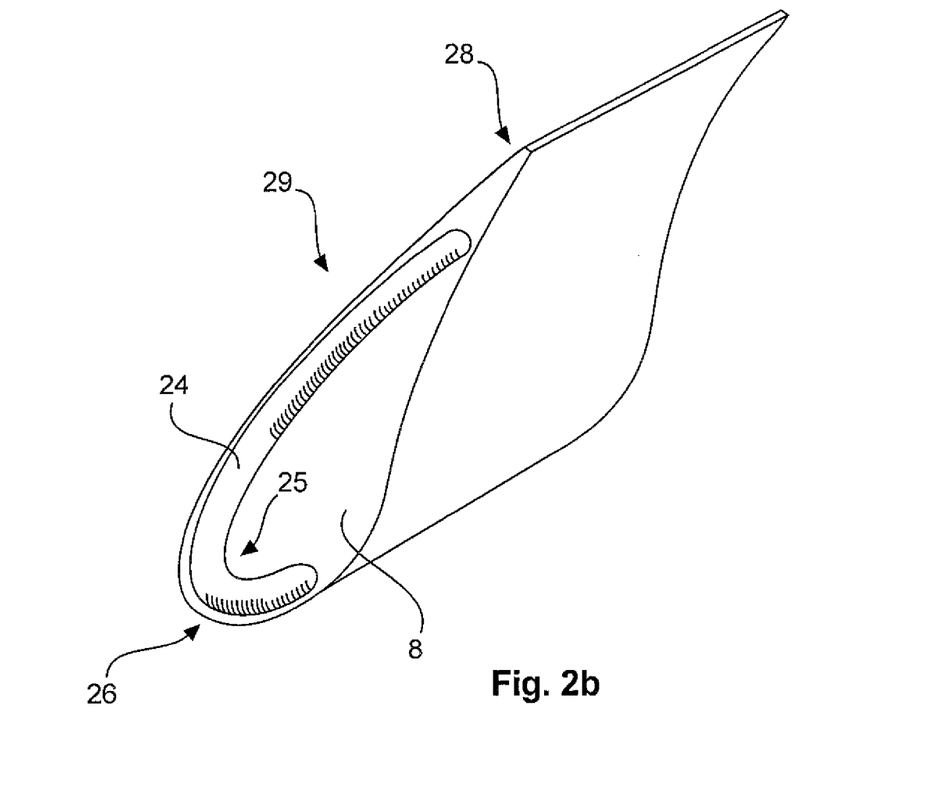

In an alternative variant from FIG. 2b, while a hollow body 24 is arranged on the lateral surface 8 near the edge, said hollow body extends, however, only in the region of a leading edge 26 and on one side to a trailing edge 28 and is open in some regions. This variant may make sense, in particular, in the case of dimensions of the high lift component 29, which dimensions are too narrow for the integration of a hose-like hollow body 22 as shown in FIG. 2a with a largely closed circumference.

It cannot be assumed that the hollow bodies shown, after single filling with a suitable fluid, always provide adequate tension that permits flexible sealing of the respective gap 10. For this purpose a fluid connection 34 may be provided on a hollow body 30 or 32, shown in FIG. 3, which fluid connection 34 comprises a filler neck 38 that is bonded or welded to the respective hollow body 30 or 32 in a fluid-proof manner. A free end is used to accommodate a fluid line 36 that can also be bonded to or welded to the filler neck 38; or as an alternative is mounted by means of a clamping assembly.

Figure 3:
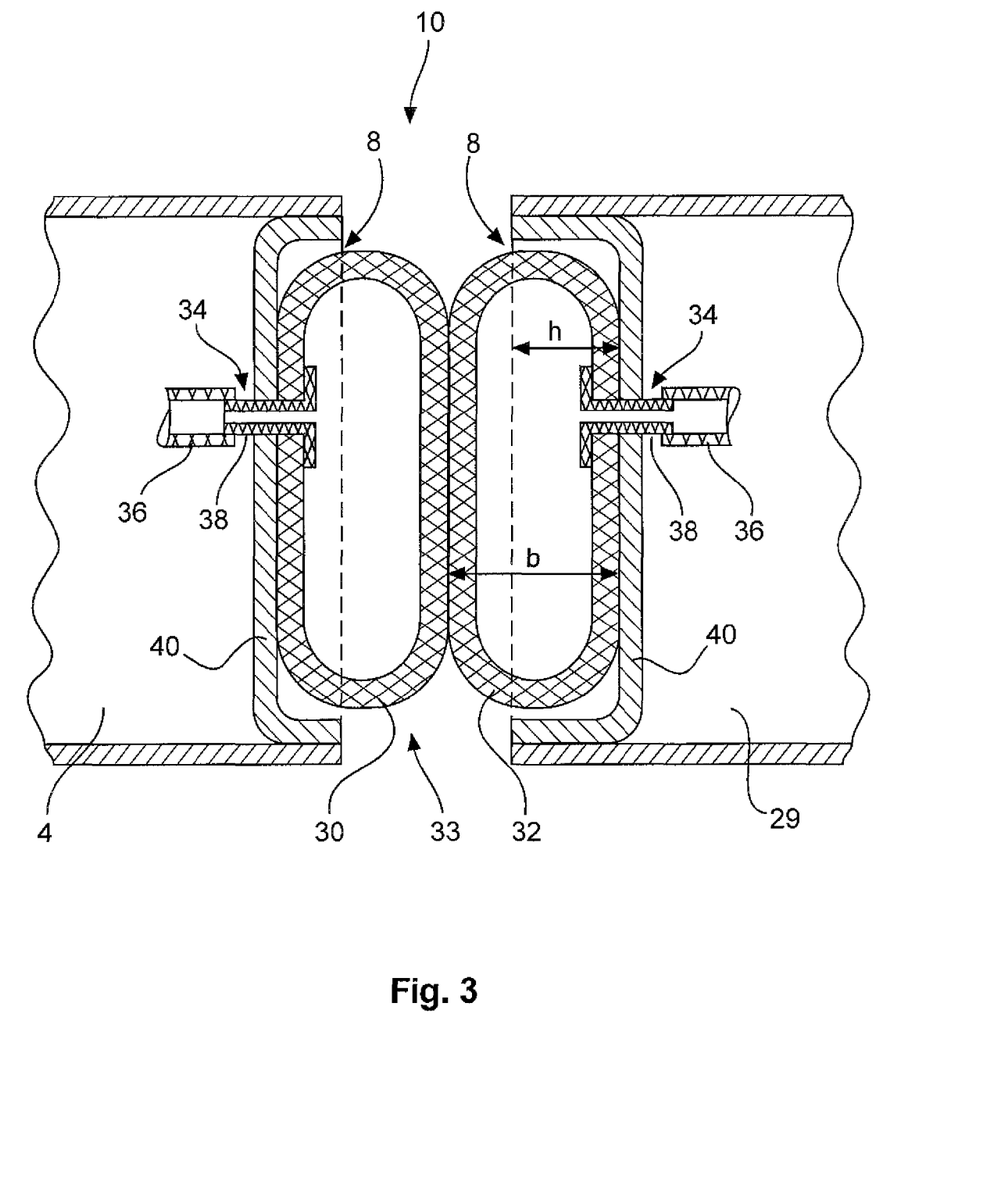
FIG. 3 shows a detailed section of a connection to an intermediate seal arrangement.

The neck 38 extends, for example, through a wall 40 into the interior of the high lift component 4, wherein the wall 40 has been implemented as a recess whose floor is offset back to the lateral area 8 of the high lift component 4. In the diagram the hollow bodies 30 and 32 comprise a width b that is greater than the extension h, defined by the wall 40, into the interior of the high lift components 4. Consequently, when viewed from the respective wall 40, said hollow bodies 30 and 32 project somewhat beyond the lateral surface 8 in order to provide a sealing face. Furthermore, by positioning it in a recess, the hollow body can be prevented from sliding out. In this arrangement the recess can continue to determine the path of extension of the hollow bodies 30 and 32.

For example a pump or a blower within the high lift component 4 or within the wing 2 or in some other position inside or outside the aircraft fuselage may be used as a suitable fluid source, wherein ambient air may be used as a fluid. As an alternative, it would also be possible to use compressed-gas tanks that may be regularly filled up or exchanged.

In another exemplary embodiment according to FIGS. 4a to 4d, hollow bodies 43 are connected to a passage 42 that extends from an outer lower surface 46 of a high lift component 44, which outer lower surface 46 in an extended state at least in some regions faces downstream, into the interior of said high lift component so that on the aforesaid a pressure differential between a static and a dynamic pressure is present along the respective high lift component 44 for introducing air into hollow bodies of an intermediate seal. In this arrangement the high lift component 44 is, in particular, designed as a Krueger flap that in a stowed-away position is arranged on an underside of the wing 2 in a recess 48, and during activation is deflected by way of adjustment kinematics against the direction of airflow in the direction of flight x, wherein onwards from a certain deflection point on the underside of the high lift component 44 the pressure is higher than in the interior of the aforesaid, which can be utilized for inflating the hollow bodies. Furthermore, this embodiment is associated with a particular advantage in that when the high lift component 44 is arranged in a stowed-away position the passage 42 that extends into the interior is closed by the bottom surface of the recess on the underside of the wing, and consequently there is no influence on the airflow during cruise flight.

Figure 4A:
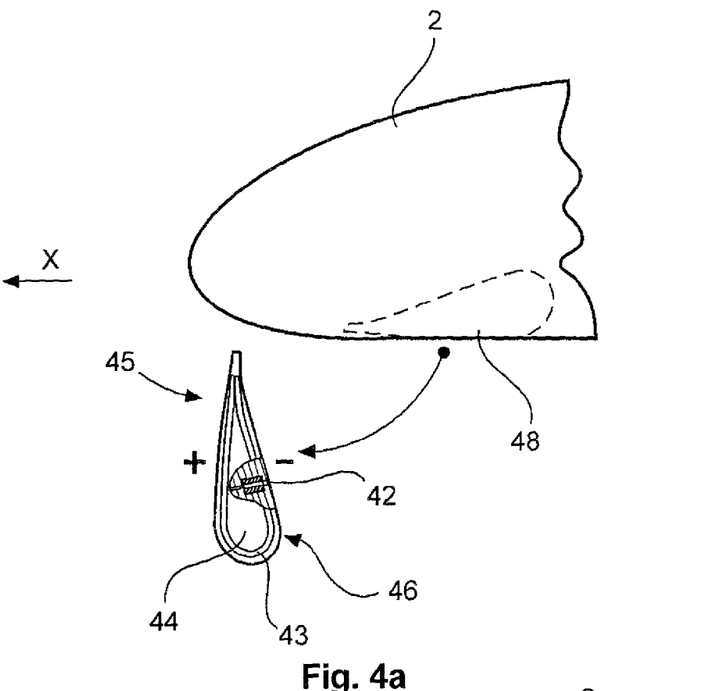
FIGS. 4a to 4e show partial section views (FIGS. 4a, 4b and 4e) and detailed section views (FIGS. 4c and 4d) of further embodiments of a high lift component.
Figure 4B:
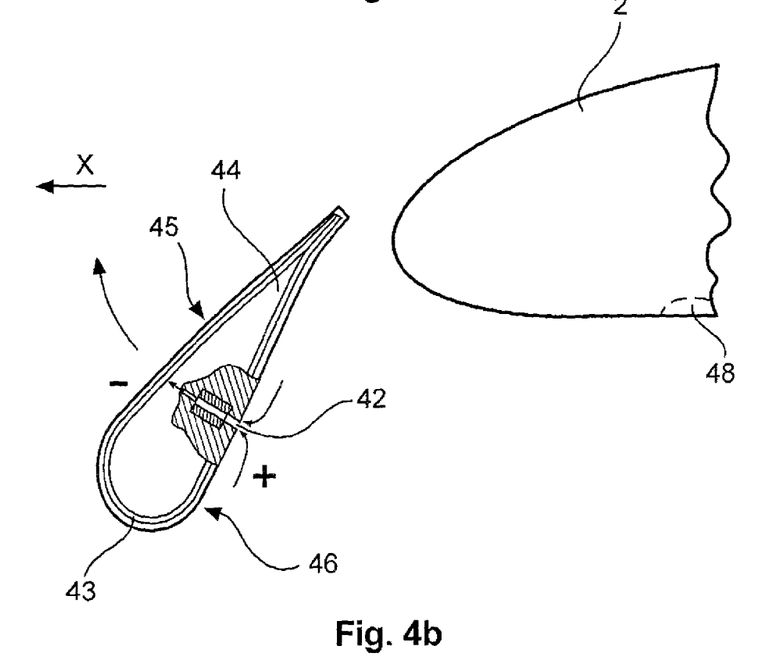
Figure 4C:
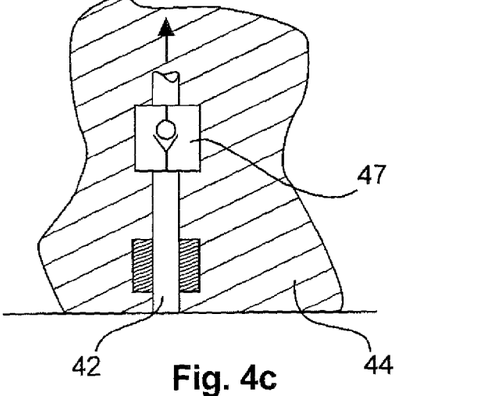
Figure 4D:
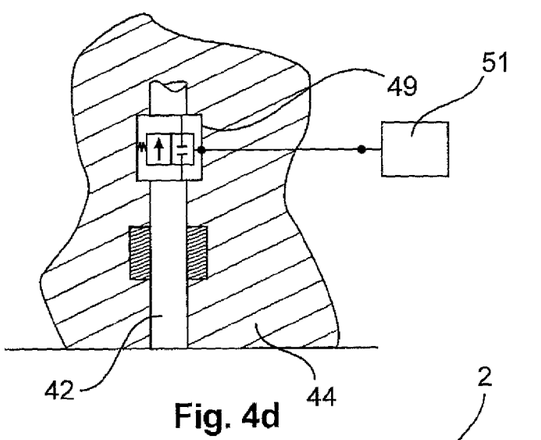

As shown in FIGS. 4c and 4d, it is also possible to use valves 47 and 49 that are designed either as nonreturn valves or as switching valves. The switching valve can be connected to a control unit 51, with said switching valve being opened, for example, if a setpoint position of the high lift component 44 is reached when adjacent high lift components have travelled along the longest displacement path. The corresponding signal can take place automatically from a flight control system.

Of course, an intermediate seal 12 according to an embodiment of the invention can also be implemented with the use of hollow bodies that are not of a hose-like design but instead are larger-areas, individual, and shape-adapted pillow-like hollow bodies, wherein this might possibly result in weight disadvantages and would require a larger fluid volume. However, as a result of a larger extension it would also be possible to use greater wall thicknesses for the hollow bodies, which in turn results in improved wear resistance and thus improved service life. The deformation behavior may improve as a result of the spatially increased extension of the intermediate seal 12, and in addition the area contact would be better, when compared to hose-like bodies, in particular in the case of different displacement speeds between adjacent high lift components.

Figure 4E:
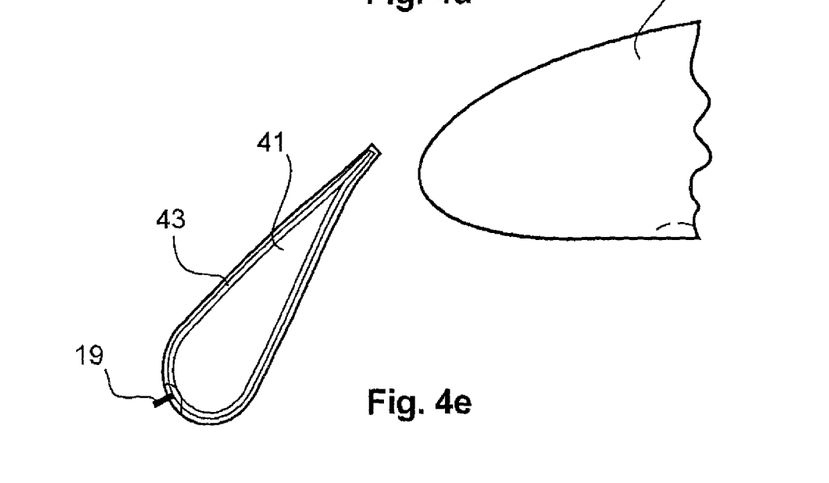

It would also be possible to use a pitot tube 19 as a fluid source, which pitot tube 19 in FIG. 4e is connected to a hose-like hollow body 43 of a high lift component 41. By subjecting the pitot tube 19 to an airflow, on a fluid inlet a pressure can be generated that is higher than the ambient pressure.

Figure 5:
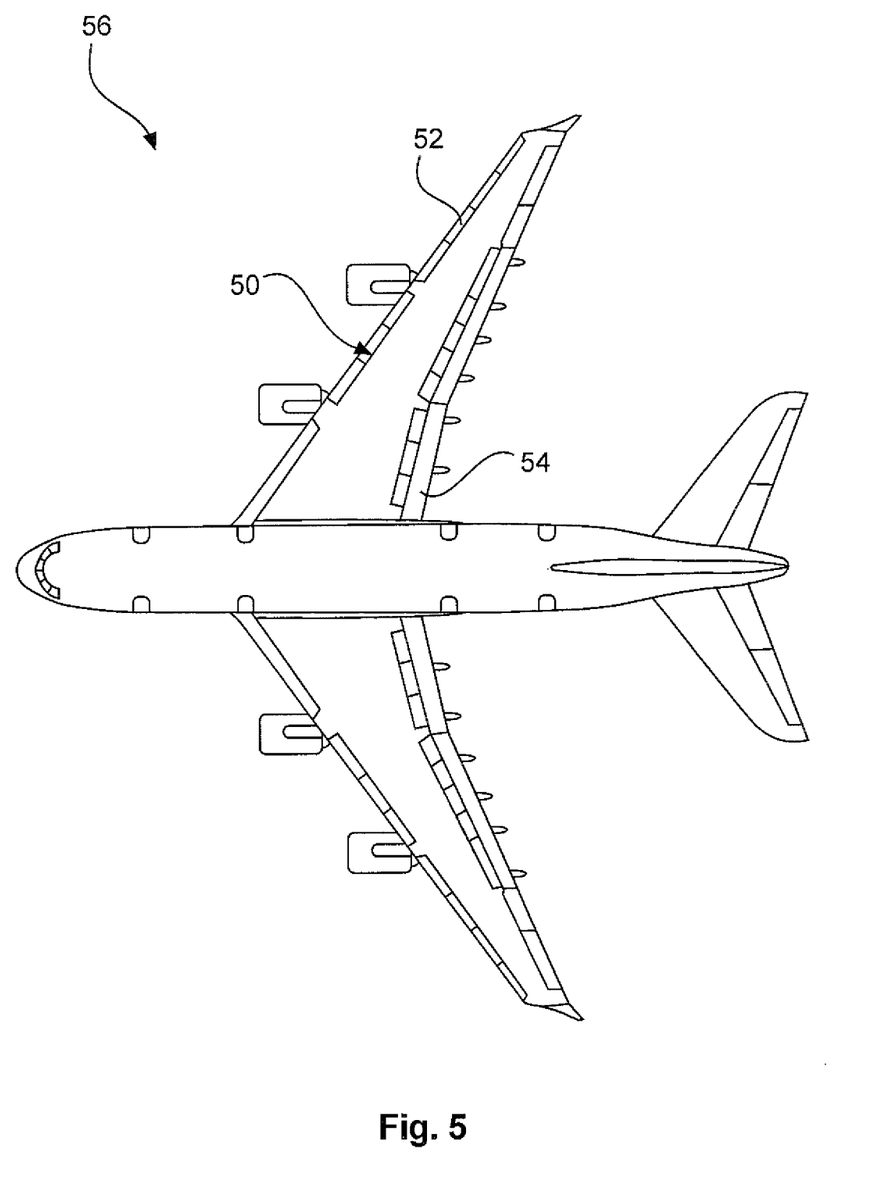
FIG. 5 shows an aircraft comprising at least one high lift component according to the invention.

FIG. 5 shows an aircraft 56 comprising a high lift system 50 that comprises a number of high lift components 52 and 54 with intermediate seals 12.

Figure 6:
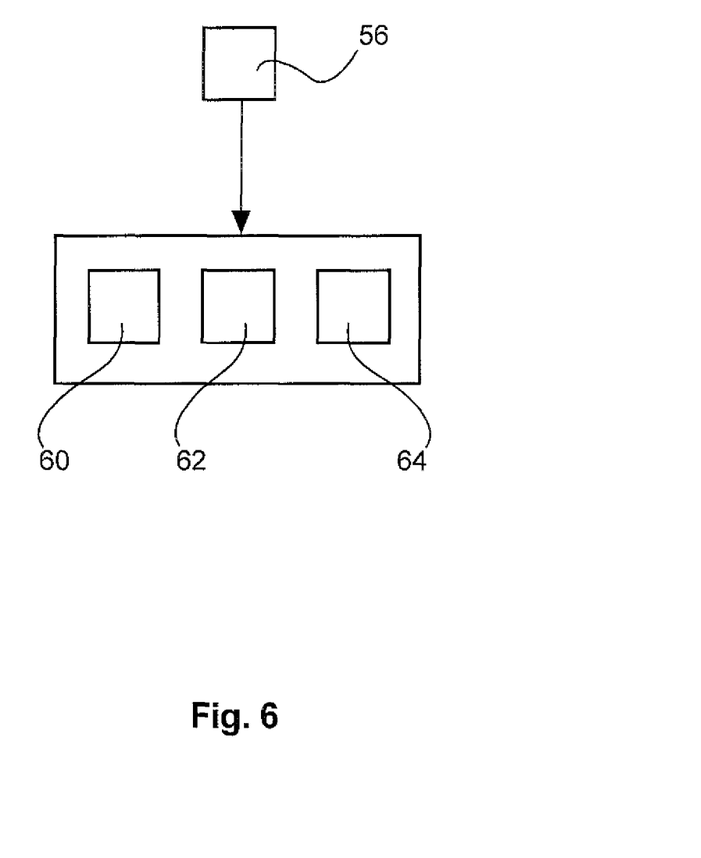
FIG. 6 shows a diagrammatic block-based view of a method according to the invention.

The method according to an aspect of the invention, shown in FIG. 6, for adjusting the high lift characteristics of an aircraft comprises, as an example, the steps of extending 56 two adjacent high lift components 4, 29, 31, 41, 44 of the aircraft from a retracted position to an extended position, and of expanding 58 at least one intermediate seal 12, 25, 33, which in the extended position of both high lift components 4, 29, 31, 41, 44 is located between the high lift components 4, 29, 31, 41, 44, so that in the extended position of the high lift components 4, 29, 31, 41, 44 the at least one intermediate seal 12, 25, 33 is expanded in such a manner that the space between the high lift components 4, 29, 31, 41, 44 is essentially closed by the at least one intermediate seal 12, 25, 33. As an example, the method involves introducing 60 fluid into at least one hollow body 18, 20, 24, 30, 32, 43 of the intermediate seal, wherein this can comprise introducing 62 ram air. As described above, introducing 62 ram air can take place by way of a passage 42 or a pitot tube 19. Controlling a valve for opening and closing makes it possible to selectively introduce fluid into the intermediate seal.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A high lift system comprising:
   first and second laterally adjacent high lift components; and
   at least one intermediate seal on each of the first and second high lift components situated in between the first and second high lift components in an extended state of the first and second high lift components, each intermediate seal having at least one hollow body made of an elastic material;
   wherein the at least one hollow bodies each comprises a fluid inlet connectable to a fluid source; and
   wherein the intermediate seals of the first and second high lift components in the extended state of the first and second high lift components are expanded in such a manner that the intermediate seals touch and together substantially close a space between the first and second high lift components.

2. The high lift system of claim 1, wherein each of the hollow bodies of the at least one intermediate seals is a hose-like body arranged on the lateral surface of the respective high lift component.

3. The high lift system of claim 1, further comprising:
   an upper outer surface which in an extended state of the respective high lift component at least in some regions faces upstream, and a lower outer surface which in the extended state at least in some regions faces downstream,
   a passage extending as the fluid source from the lower surface or from the upper surface into the interior of the respective high lift component;
   wherein the fluid inlet is situated in the interior of the respective high lift component and is connected to an end of the passage, the end of the passage projecting into the interior of the respective high lift component.

4. The high lift system of claim 1, wherein each of the first and second high lift components is configured as a Krueger flap comprising a passage connected to the fluid inlet on a surface of the respective flap that in the extended state is a lower outer surface and that at least in some regions faces upstream.

5. The high lift system of claim 1, further comprising a valve connected to the passage.

6. The high lift system of claim 5, wherein the valve is a switching valve or regulating valve that for the purpose of selectively introducing fluid into the hollow body is connected to a control unit.

7. The high lift system of claim 1, wherein the fluid source is configured as a pitot tube positionable on an outside of the respective high lift component, of a superordinate wing or of some other part of the aircraft concerned, and connectable to the fluid inlet of the hollow body by way of a fluid line.

8. The high lift system of claim 1, wherein each of the hollow bodies is hose-like body, comprising two closed ends, and extending along a path on the lateral surface of the respective high lift component, which path on the border extends along an upper outer surface and a wing leading edge.

9. The high lift system of claim 1, wherein each of the hollow bodies is arranged so as to be largely flush with a respective profile contour.

10. A method for adjusting high lift characteristics of an aircraft, comprising:
    extending first and second adjacent high lift components of the aircraft from a retracted position to an extended position; and
    expanding at least one intermediate seal on each of the first and second high lift component located between the first and second high lift components in an extended state of the first and second components so that in the extended position of the first and second high lift components the at least one intermediate seals are expanded in such a manner that that the intermediate seals touch and together substantially close a space between the first and second high lift components.

11. The method of claim 10, further comprising:
    introducing fluid into at least one hollow body of the at least one intermediate seal.

12. The method of claim 10, wherein introducing fluid includes introducing ram air.

* * * * *